M. R. KONDOLF.
BOX COVER.
APPLICATION FILED MAR. 22, 1916.

1,234,480.

Patented July 24, 1917.

Witness
Eric Ischinger.
Edna K. Booth.

Inventor
Mathias R. Kondolf
By Frank Keiper
Attorney

M. R. KONDOLF.
BOX COVER.
APPLICATION FILED MAR. 22, 1916.

1,234,480.

Patented July 24, 1917.
3 SHEETS—SHEET 2.

Witness
Eric Ischinger
Edna K. Booth

Inventor
Mathias R. Kondolf
By Frank Keiper
Attorney

UNITED STATES PATENT OFFICE.

MATHIAS R. KONDOLF, OF ROCHESTER, NEW YORK.

BOX-COVER.

1,234,480.                Specification of Letters Patent.    Patented July 24, 1917.

Application filed March 22, 1916. Serial No. 85,978.

*To all whom it may concern:*

Be it known that I, MATHIAS R. KONDOLF, a citizen of the United States, residing at Rochester, in the county of Monroe and State of New York, have invented certain new and useful Improvements in Box-Covers, of which the following is a specification.

The object of this invention is to provide an improved cover for boxes.

Another object of this invention is to provide a cover for a box which is particularly adapted to draw the opposite sides of a box with inclined walls into substantially parallel position.

This and other objects of the invention will be fully illustrated in the drawings, described in the specification and pointed out in the claims at the end thereof.

In the drawings.

In the drawings like reference numerals indicate like parts.

Figure 1:
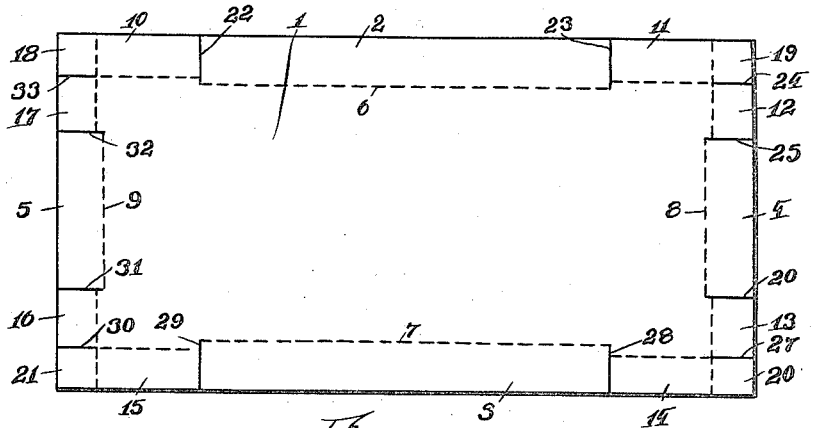
Figure 1 is a plan view of one of the blanks used in making my improved box cover.

In the drawings Fig. 1 shows a blank in which reference numeral 1 indicates the main body of the cover having the flanges 2 and 3 on the side thereof and the flanges 4 and 5 at the ends thereof. The flanges 2 and 3 are bent along the dotted lines 6 and 7 and the flanges 4 and 5 are bent along the dotted lines 8 and 9 respectively. Also formed on the main body 1 of the blank shown in Fig. 1 are the flanges 10, 11, 12, 13, 14, 15, 16 and 17. The continuations of the flanges 10 and 11 form the corner pieces 18 and 19 respectively and the continuations of the flanges 14 and 15 form the corner pieces 20 and 21 respectively.

As shown in Fig. 1 all of the flanges described above are formed by cutting the blank from the margin thereof on the lines numbered 22 to 33 inclusive.

It will be understood that the blank shown in this figure will be cut along the full lines and bent along the dotted lines. It will be seen from an inspection of Fig. 1 that the lines along the flanges 2, 3, 4 and 5 are offset from the lines on which the flanges 10 to 17 inclusive are bent.

In forming the cover out of the blank shown in Fig. 1 the flanges 2, 3, 4 and 5 are bent at right angles to the main body 1 and in use will lie within and against the walls of the box to which the cover may be attached. The flanges 10 to 17 inclusive are also bent substantially at right angles to the body 1 of the blank to overlap and lie without the walls of the box when attached thereto. The corner pieces 18, 19, 20 and 21 are bent substantially at right angles to the flanges to which they are attached and can be either placed under or over the adjacent flanges of the cover.

Figure 5:
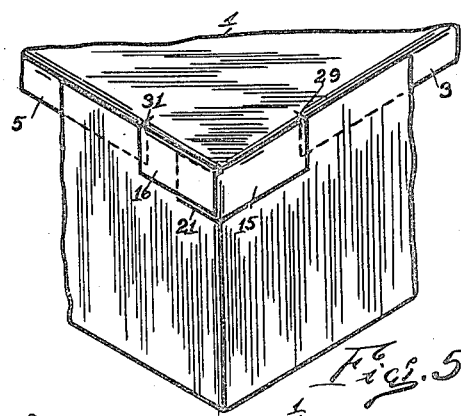

Fig. 5 shows a cover partly broken away formed out of the blank 1 and placed on a portion of a box as above described.

Figure 2:
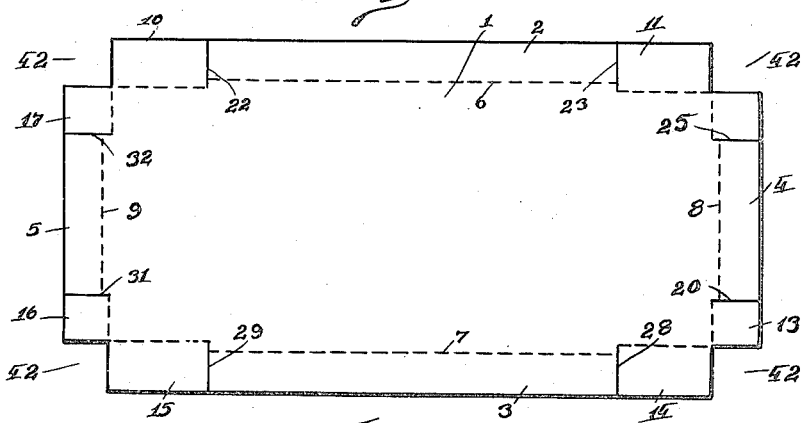
Figs. 2, 3 and 4 are plan views of modified forms of the blank used for making my improved box cover.
Figure 6:
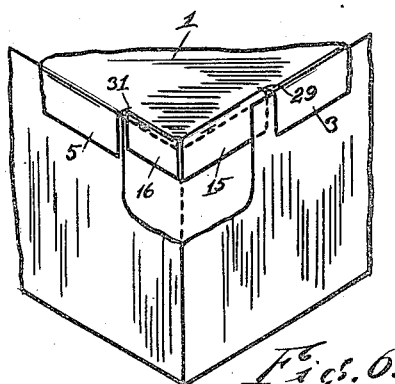
Figs. 5, 6, 7 and 8 are detail perspective views of the box covers formed out of the blanks shown in Figs. 1, 2, 3 and 4 respectively, showing these box covers attached to a box partly broken away.

Fig. 2 shows a blank similar to the one described in Fig. 1 except that the flanges 2, 3, 4 and 5 are bent on lines which will cause these flanges to overlap and lie without the walls of the box as shown in Fig. 6. In this case the flanges 10 to 17 inclusive are bent to lie within the walls of the box as shown in Fig. 6.

Figure 3:
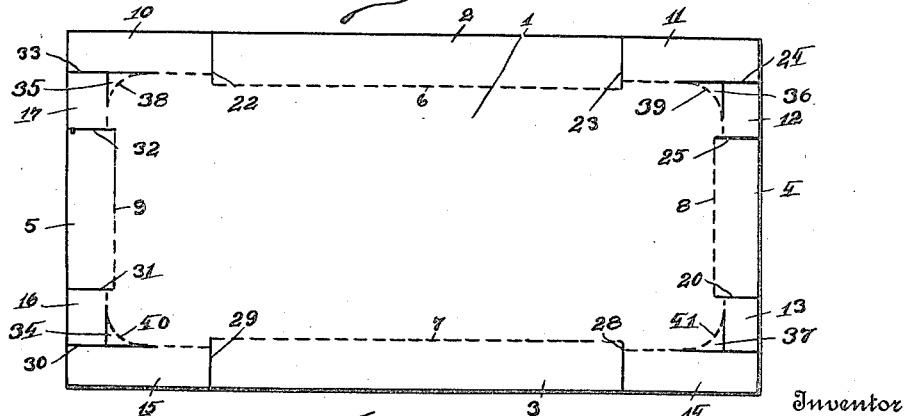

The blank shown in Fig. 3 is identical with the one shown in Fig. 1 except that the cover bent therefrom will be adapted to fit a round cornered box. For this purpose the sections 34, 35, 36 and 37 on the corners of the main body 1 are bent down along the lines 38, 39, 40 and 41 to conform with the radius of the box corners.

Figure 7:
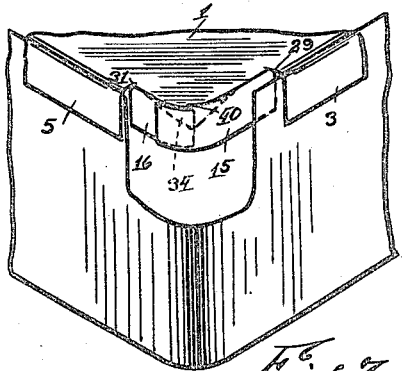
Figure 8:
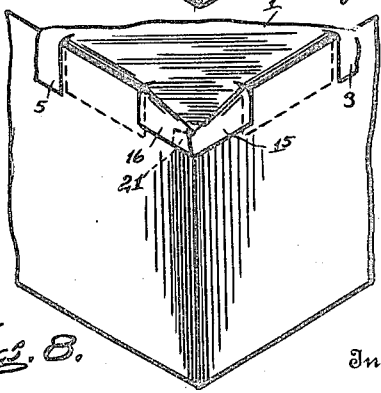

Fig. 7 shows a box cover partly broken away formed out of the blank shown in Fig. 3 as it will appear when attached to a box. If desired the sections 34, 35, 36 and 37 need not be bent down but may be left to project over the corners of the box.

Covers of the type illustrated in this application may be used in connection with boxes having parallel sides or may be used in connection with boxes having tapering sides.

If the sides of the box are parallel the corners of the cover may engage outside of the corners of the box and the offset flanges may engage inside of the sides of the box. A blank for such a cover is shown in Fig. 1 of this application, or the corners of the cover may engage inside of the corners of the box and the offset flanges of the cover may engage outside of the sides of the box and a blank for such a cover is shown in Fig. 2 of the drawings of this application.

These covers, however, may also be used in connection with boxes having inclined walls and in connection with such boxes they may be made to serve several purposes.

Boxes having inclined walls may be readily nested for shipment and storage and other purposes. Blanks for making such boxes are shown in my applications 73,468 filed January 21, 1916 and 80,876 filed February 28, 1916. In such boxes the perimeter of the top will be greater than the perimeter of the bottom.

When such boxes are filled with packages of uniform cylindrical or cubical shape, there will be considerable lost space at the top of the box between its sides and its contents. This lost space can be eliminated by drawing in the sides of the box at the top and holding the box in that shape.

Figure 4:
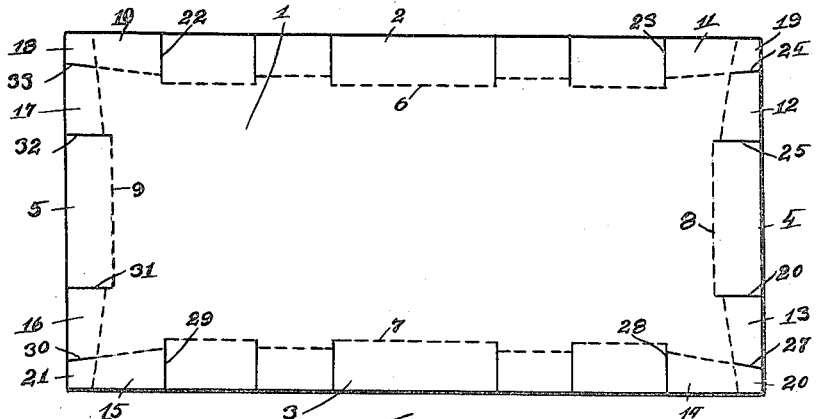

This can best be done by the use of a cover that is smaller than will fit the top of the box in its normal condition. Such a cover has been shown in Figs. 2, 4 and 9 of this application. These covers are substantially rectangular in shape. The corners of the cover shown in Figs. 2 and 9 fit inside the corners of the box while the sides of the cover intermediate the corners fit outside of the sides of the box. The corners of the cover shown in Fig. 4 are intended to fit outside the corners of the box and the wide flanges are intended to fit inside the sides of the box and the narrow flanges are intended to fit outside the sides of the box. The cover in either case is fitted to the box and placed in position thereon by first springing the sides of the box inwardly and then placing the cover thereon as above described. With the cover shown in Figs. 2 and 9 the corners of the box will be left outside of the cover and with the cover shown in Fig. 4 the corners of the box will be held inside of the cover.

These covers may also be used in connection with boxes having inclined sides where the sides are not sprung inwardly but are left in their normal position or where the sides have been even sprung out at the middle.

If the sides are left in their normal position the cover shown in Fig. 1 may be used, in which case the corners of the cover will be placed outside the corners of the box and the flanges will be placed inside the sides of the box or the cover shown in Fig. 2 may be used, in which case the corners may be placed inside of the box and the flanges may be placed outside of the box.

If the sides of the box are sprung outward the cover shown in Fig. 2 could be used to better advantage, in which case the corners of the cover would be placed inside of the corners of the box and the flanges of the cover would be placed outside the sides of the box.

Figure 9:
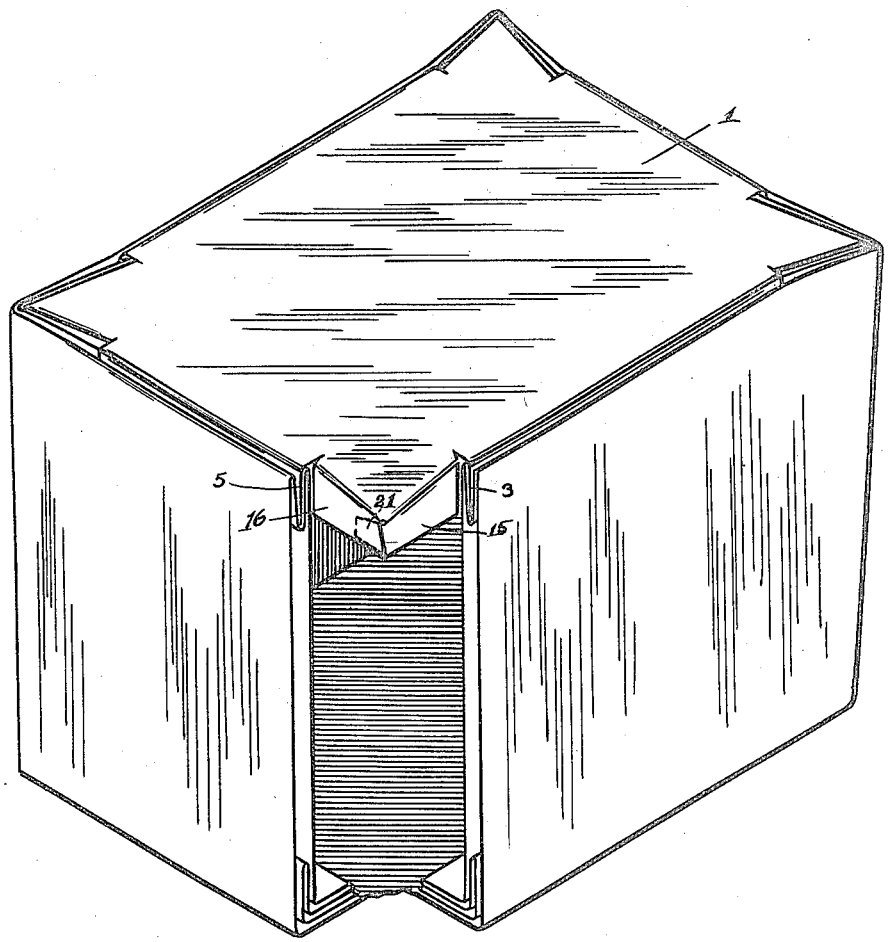
Fig. 9 is a perspective view of a box having pockets to receive the flanges for my improved box cover, the box being partly broken away.
Figure 10:
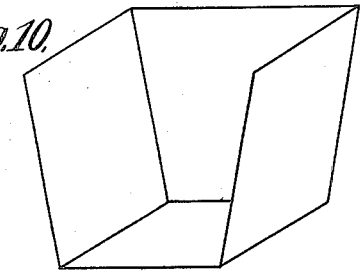
Fig. 10 is a perspective view of a portion of my tapered box.
Figure 11:
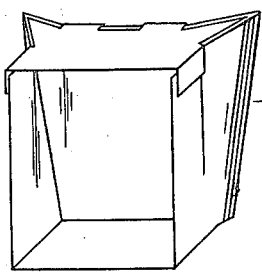
Fig. 11 shows the portion of the box of Fig. 10 with the intermediate part of the sides drawn by the cover to vertical position or substantially parallel to each other.

For this purpose I provide a blank as shown in Fig. 4, or a modification of same as shown attached to the box in Fig. 9 is used. In these blanks the corners of the main body 1 of the cover are formed so as to fit the shape of such a tapered box when drawn together as above described.

It will be understood that it is impractical to so fit an ordinary flange cover or one having flaps in such a manner so as to allow the drawing in of the sides as described and still form a complete closure for the box.

The flanges may be cut at more places than shown in the drawings and thus provide more individual flanges which may be alternately placed within and without the walls of a box thus strengthening the walls and more firmly securing the cover to the box.

The covers as above described are particularly adapted for use of a box having cover flange pockets as described in my former application, Serial Number 80,876. The said pockets on the tapered boxes do not extend entirely to the corners and therefore the cover flanges can be placed outside or inside of the walls of the box at such points.

The corner pieces 18, 19, 20 and 21 simply serve as reinforcing pieces and if desired they can be left off the blanks as shown at 42 in Fig. 2 so that the cover formed therefrom will appear as shown in Fig. 6 in which case the adjacent flanges at the corners will simply meet and not overlap.

As shown in all of the figures, the creases, score lines or folding lines by which the corner flanges and intermediate flanges are joined to the body of the cover, are offset from each other. When the flanges are bent up at right angles to the body of the cover the two sets of flanges will stand in lines parallel to each other except the corner flanges of Figs. 4 and 9 will not be parallel for the score lines of these flanges are placed at an angle for a different purpose.

Adjacent flanges will be offset to each other due to the offsetting of the score lines by which the flanges are joined to the body of the cover. Between the ends of adjacent flanges that are offset as above described an opening will occur, sufficient to receive the side of the box. Through a series of these openings the sides of the box can pass so that when the cover is placed on the box part of the cover flanges can be placed within and part can be placed without the sides of the box. In this way the cover is supported by the sides of the box and the sides of the box are held in place by the flanges against forces acting both inwardly and outwardly.

In Fig. 9 I have shown a cover which is the same in principle in which the flanges are engaged with pockets formed in the sides of the box, which pockets have been described in my prior application No. 80,876. In this Fig. 9 the corners of the cover are shown placed inside the corners of the box.

A suitable and firm seat is also procured for the use of sealing tapes in fastening the cover to the box. This also permits the cover to draw the walls of the box into substantially parallel position and still obtain a complete closure when the flanges are bent to position.

It will be understood that in every case where sealing tape is used to fasten the cover onto the box the cover will greatly assist in taking the strain off of the tapes. The cramping effect obtained by holding the walls of the box in the cuts between the flanges materially assists in locking the cover in place.

I claim:

1. A blank for a box cover comprising a central body portion, a flange integral with said body portion and being capable of being bent at right angles thereto, said flange being divided at twelve points to form corner, side and end flanges, adjacent divisions of the flanges and their folding lines being offset from each other thereby providing spaced parallel flanges adapted to fit within and without a container.

2. A blank for a box cover comprising a central body portion, a flange integral with said body portion and being capable of being bent at right angles thereto, said flange being divided at twelve points to form corner, side and end flanges, said corner, side and end flanges and their folding lines being offset from one another.

3. A cover for a box comprising a central body, flanges integral therewith, said flanges and their folding lines being offset from each other, said flanges being adapted to be placed either within or without all the sides of a box.

4. A cover for a box comprising a central body, flanges formed around the perimeter of said body, said flanges being bent to conform to the outline of a box, said flanges being adapted to alternately overlap the inside and the outside of a box, and adjacent flanges on each side and their folding lines being offset from each other.

5. A cover for a box comprising a central body, separate flanges formed on each side of said body, part of said flanges being bent to lie inside the sides of a box and part of said flanges being bent to lie outside the sides of a box, said flanges being adapted to hold all the sides of the box against inwardly and outwardly acting forces.

6. A cover for a box comprising a central body, separate flanges formed on each side of said body, part of said flanges being bent to lie inside the sides of a box and part of said flanges being bent to lie outside the sides of a box, each side of a box being held firmly between consecutive flanges against lateral movement.

7. A cover for a box comprising a central body, corner sections on said body, said corner sections being shaped to conform to the outline of the corners of a box, flanges on said corner sections to engage the inside or outside of the corners of the box, side flanges formed on each of the sides of said body intermediate said corner sections, said intermediate flanges being adapted to hold the sides of a box to cause said corner sections and said flanges thereon to completely close the corners of said box.

8. A box comprising a body having opposite walls normally sloping outwardly and a cover adapted to hold the intermediate portions of said opposite walls in substantially parallel position while permitting the end portions to retain substantially their normal positions.

9. A box comprising a body having opposite walls normally sloping outwardly and means to hold the intermediate portions of said opposite walls in substantially parallel position while permitting the end portions to retain substantially their normal positions.

In testimony whereof I affix my signature.

MATHIAS R. KONDOLF.